(12) United States Patent
Chandra et al.

(10) Patent No.: US 9,665,915 B1
(45) Date of Patent: *May 30, 2017

(54) SYSTEM AND METHOD FOR FACILITATING VIRTUAL GOODS GIFTING

(71) Applicant: KABAM, INC., San Francisco, CA (US)

(72) Inventors: Navendu Chandra, San Francisco, CA (US); Bryan Schwab, Redwood City, CA (US); Schubert Lobo, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/802,272

(22) Filed: Jul. 17, 2015

Related U.S. Application Data

(63) Continuation of application No. 14/071,583, filed on Nov. 4, 2013, now Pat. No. 9,098,874, which is a (Continued)

(51) Int. Cl.
| | |
|---|---|
| *G06Q 30/00* | (2012.01) |
| *G06Q 50/00* | (2012.01) |
| *A63F 13/792* | (2014.01) |
| *G06Q 30/06* | (2012.01) |
| *G07F 17/32* | (2006.01) |

(52) U.S. Cl.
CPC ............ *G06Q 50/01* (2013.01); *A63F 13/792* (2014.09); *G06Q 30/0619* (2013.01); *G06Q 30/0641* (2013.01); *G06Q 30/0643* (2013.01); *G07F 17/3248* (2013.01); *G07F 17/3281* (2013.01)

(58) Field of Classification Search
CPC ........... G06Q 30/0601–30/0643; G06Q 30/08; G06Q 50/01; G07F 17/32; G07F 17/3223; G07F 17/3225; G07F 17/3237; G07F 17/3239; G07F 17/323; G07F 17/3241; G07F 17/3272; G07F 17/326; G07F 17/3262; G07F 17/3211; G07F 17/3286; (Continued)

(56) References Cited

U.S. PATENT DOCUMENTS

| | | | |
|---|---|---|---|
| 8,147,328 B2 | 4/2012 | Carroll | |
| 8,210,940 B2 | 7/2012 | Carroll | |

(Continued)

FOREIGN PATENT DOCUMENTS

| | | |
|---|---|---|
| WO | 2013163378 | 10/2013 |
| WO | 2015002930 | 1/2015 |

OTHER PUBLICATIONS www.SecondLife.com, Date Range: Oct. 27, 2009 to Nov. 8, 2011 (Oct. 27, 2009)-(Nov. 8, 2011), [recovered from www.Archive.org], 38 pages.

*Primary Examiner* — William Allen
(74) *Attorney, Agent, or Firm* — Sheppard Mullin Richter & Hampton LLP

(57) ABSTRACT

Gifting of virtual items between users of a virtual space may be facilitated. A purchase interface may be presented to a first user. The purchase interface may be configured to receive selection from the first user of (i) a virtual item for purchase, and (ii) one or more users with which the first user has established a virtual space relationship. Responsive to selection by the first user through the purchase interface of a first virtual item and a second user with which the first user has established a virtual space relationship, the first virtual item may be distributed to the second user in the virtual space.

16 Claims, 3 Drawing Sheets

Related U.S. Application Data continuation of application No. 13/659,588, filed on Oct. 24, 2012, now Pat. No. 8,595,091, which is a continuation of application No. 13/456,585, filed on Apr. 26, 2012, now Pat. No. 8,615,449.

(58) Field of Classification Search
CPC ............. G07F 17/3218; G07F 17/3248; G07F 17/3281
See application file for complete search history.

(56) References Cited

U.S. PATENT DOCUMENTS

| | | |
|---|---|---|
| 8,308,569 B2 | 11/2012 | Carroll |
| 8,342,951 B2 | 1/2013 | Cheng |
| 8,352,566 B2 | 1/2013 | Cohen |
| 8,595,091 B1 | 11/2013 | Chandra |
| 8,615,449 B2 | 12/2013 | Chandra |
| 9,098,874 B2 | 8/2015 | Chandra |
| 2007/0129126 A1 | 6/2007 | Van Luchene |
| 2007/0155465 A1 | 7/2007 | Walker |
| 2008/0189188 A1 | 8/2008 | Morgenstern |
| 2009/0254358 A1 | 10/2009 | Li |
| 2010/0227675 A1 | 9/2010 | Luxton |
| 2010/0280860 A1 | 11/2010 | Iskold |
| 2010/0280861 A1 | 11/2010 | Rossen |
| 2010/0318925 A1 | 12/2010 | Sethi |
| 2011/0010270 A1 | 1/2011 | Hamilton, II |
| 2011/0212762 A1 | 9/2011 | Ocko |
| 2011/0212769 A1 | 9/2011 | Carroll |
| 2012/0004038 A1 | 1/2012 | Van Luchene |
| 2012/0110477 A1 | 5/2012 | Gaume |
| 2012/0258805 A1 | 10/2012 | Harris |
| 2013/0005437 A1 | 1/2013 | Bethke |
| 2013/0005473 A1 | 1/2013 | Bethke |
| 2013/0079075 A1 | 3/2013 | Osvald |
| 2013/0290147 A1 | 10/2013 | Chandra |
| 2014/0067580 A1 | 3/2014 | Chandra |
| 2015/0005054 A1 | 1/2015 | Smalley |

SYSTEM AND METHOD FOR FACILITATING VIRTUAL GOODS GIFTING

FIELD OF THE DISCLOSURE

This disclosure relates to facilitating gifting of virtual items between users of a virtual space.

BACKGROUND

Systems facilitating purchases of virtual items are known. In these systems, however, purchased virtual items are typically associated with the purchaser. That is, a virtual item purchased by a given user will be controlled by the given user and/or added to an inventory of the given user.

SUMMARY

One aspect of the disclosure relates to a system configured to facilitate gifting of virtual items between users of a virtual space, in accordance with one or more implementations. According to exemplary implementations, a first user may be presented with one or more virtual items and one or more other users with which the first user has established a virtual space relationship. The first user may select a virtual item and one of the other users. The first user may provide payment for the selected virtual item. Upon selection and/or payment, the selected virtual item may be distributed to the selected user. In some implementations, the system may include one or more servers. The server(s) may be configured to communicate with one or more client computing platforms according to a client/server architecture. The users may access the system and/or the virtual space via the client computing platform(s).

The server(s) may be configured to execute one or more computer program modules. The computer program modules may include one or more of a space module, a user account module, a virtual item purchase module, a payment module, a virtual item distribution module, and/or other modules.

The space module may be configured to implement an instance of the virtual space executed by the computer modules to determine views of the virtual space. The views may then be communicated to the client computing platform(s) for presentation to users. The view determined and transmitted to a given client computing platform may correspond to a user character being controlled by a user via the given client computing platform. Within the instance(s) of the virtual space executed by the space module, users may control characters, objects, simulated physical phenomena (e.g., wind, rain, earthquakes, and/or other phenomena), and/or other elements within the virtual space to interact with the virtual space and/or each other. The user may have an "inventory" of virtual items that the user can use (e.g., by manipulation of a user character or other user controlled element, and/or other items) within the virtual space. Virtual items may comprise a virtual good, a virtual currency, and/or other virtual items.

The user account module may be configured to manage user accounts associated with individual users. For example, the user accounts may include a first user account associated with a first user. According to some implementations, a given user account may include one or more of social network information, alliance information, character information, and/or other information. Social network information may identify other users with which the first user has established social network relationships on a social networking platform that is separate from the virtual space.

Alliance information may identify other users with which the first user has established virtual space relationships within the virtual space. Virtual space relationships may include one or more of friendships, guilds (with guildmates), alliances, connections, followers, and/or other relationships. Virtual space relationships may include one or more types of relationships that have a functional purpose or impact within the virtual space, and/or one or more types of relationships that a social construct within the virtual space that does not have a functional result. In some implementations, a virtual space relationship between the first user and a second user may comprise a relationship formed between a first character that is controlled by the first user in the virtual space and a second character that is controlled by the second user in the virtual space.

Character information may include information associated with a character controlled by a given user in the virtual space. Examples of character information may include an appearance of a user character, abilities of a user character within the virtual space, possessions in inventory of the user character, and/or other information associated with characters controlled by users in the virtual space.

The virtual item purchase module may be configured to generate information that causes a purchase interface to be presented to a given user by a client computing platform associated with the given user. The purchase interface may be configured to receive one or more user selections. The purchase interface may be configured to present one or more virtual items for purchase. The purchase interface may be configured to facilitate browsing and/or searching among the one or more presented virtual items. A selection from the given user may include a selection of a virtual item for purchase. The purchase interface may be configured to present one or more representations corresponding to other users with the given user has established a virtual space relationship. The purchase interface may be configured to facilitate browsing and/or searching among the other users with the given user has established a virtual space relationship. A selection from a user may include a selection of one or more other users with which the user has established a virtual space relationship.

The payment module may be configured to obtain payment from a user for a virtual item. Such a virtual item may be one selected via the virtual item purchase module. In some implementations, payment may be obtained from a third-party service via a credit card, a debit card, an electronic check, an internet payment service (e.g., PayPal), and/or other services for obtaining payment. Payment information may be obtained via a field included in the purchase interface.

The virtual item distribution module may be configured to distribute the selected virtual item to the selected user in the virtual space. Such distribution may be responsive to selection by a first user through the purchase interface of a first virtual item and a second user with which the first user has established a virtual space relationship. In some implementations, distribution of the selected virtual item to the selected user may be responsive to obtaining the payment from the first user. Distribution of selected virtual item to the selected user may comprise providing control of the selected virtual item to the selected user in the virtual space. By way of non-limiting illustration, where the selected virtual item is a clothing article for a user character, the clothing article may be controlled by the selected user in the virtual space upon distribution of the clothing article. In some implementations, distribution of the selected virtual item to the selected user may comprise adding the selected virtual item to an inventory of a user character that is controlled by the selected user in the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
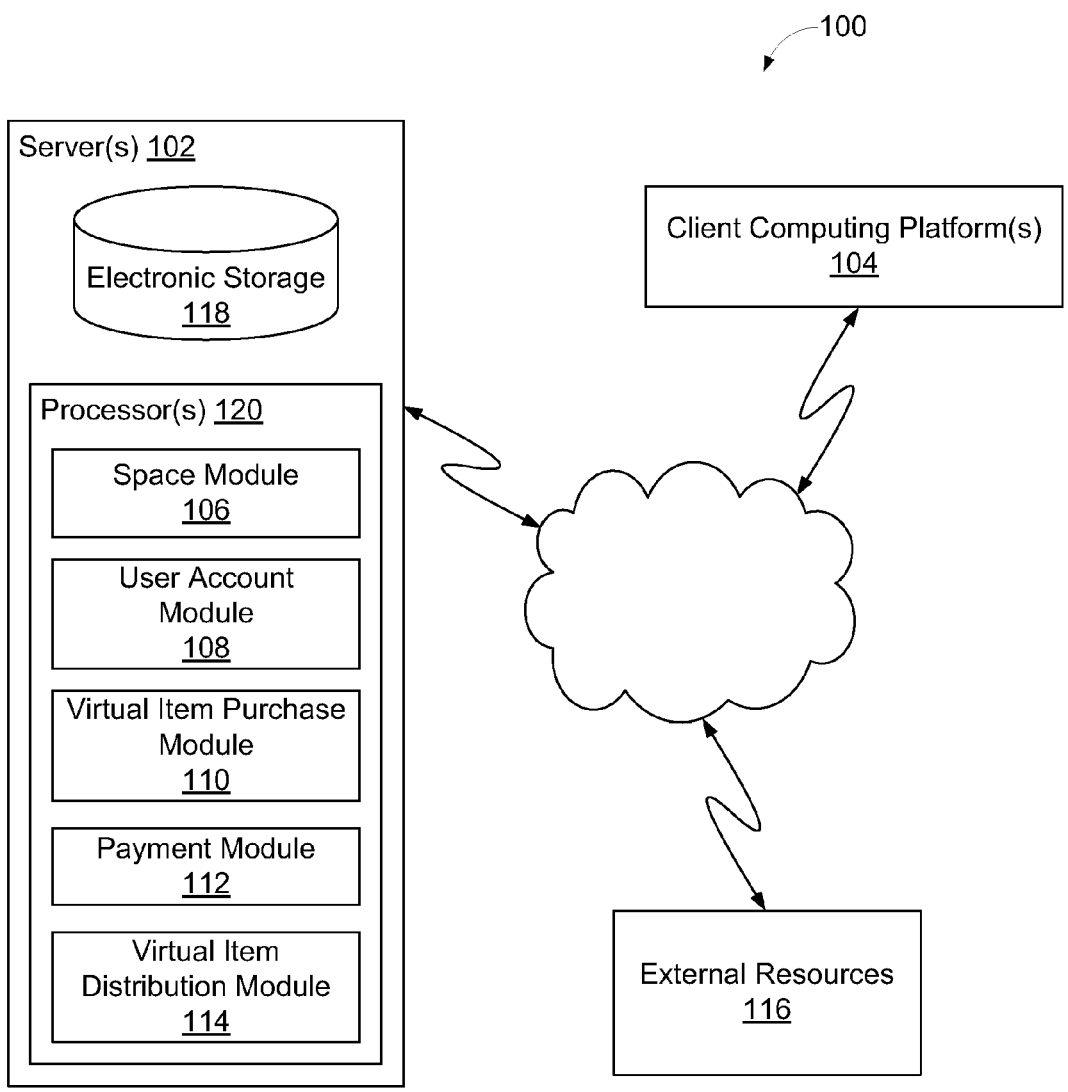
FIG. 1 illustrates a system configured to facilitate gifting of virtual items between users of a virtual space, in accordance with one or more implementations.

FIG. 1 illustrates a system 100 configured to facilitate gifting of virtual items between users of a virtual space, in accordance with one or more implementations. According to exemplary implementations, a first user may be presented with one or more virtual items and one or more other users with which the first user has established a virtual space relationship. The first user may select a virtual item and one of the other users. The first user may provide payment for the selected virtual item. Upon selection and/or payment, the selected virtual item may be distributed to the selected user. In some implementations, system 100 may include one or more servers 102. The server(s) 102 may be configured to communicate with one or more client computing platforms 104 according to a client/server architecture. The users may access system 100 and/or the virtual space via client computing platform(s) 104.

The server(s) 102 may be configured to execute one or more computer program modules. The computer program modules may include one or more of a space module 106, a user account module 108, a virtual item purchase module 110, a payment module 112, a virtual item distribution module 114, and/or other modules.

The space module 106 may be configured to implement an instance of the virtual space executed by the computer modules to determine views of the virtual space. The views may then be communicated (e.g., via streaming, via object/position data, and/or other information) from server(s) 102 to client computing platform(s) 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. In some implementations, the virtual space may include an online game played by one or more users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 106 is not intended to be limiting. The space module 106 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items that the user can use (e.g., by manipulation of a user character or other user controlled element, and/or other items) within the virtual space. Virtual items may comprise a virtual good, a virtual currency, and/or other virtual items.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 106).

The user account module 108 may be configured to manage user accounts associated with individual users. For example, the user accounts may include a first user account associated with a first user. According to some implementations, a given user account may include one or more of social network information, alliance information, character information, and/or other information. Social network information may identify other users with which the first user has established social network relationships on a social networking platform that is separate from the virtual space.

Alliance information may identify other users with which the first user has established virtual space relationships within the virtual space. Virtual space relationships may include one or more of friendships, guilds (with guildmates), alliances, connections, followers, and/or other relationships. Virtual space relationships may include one or more types of relationships that have a functional purpose or impact within the virtual space, and/or one or more types of relationships that a social construct within the virtual space that does not have a functional result. In some implementations, a virtual space relationship between the first user and a second user may comprise a relationship formed between a first character that is controlled by the first user in the virtual space and a second character that is controlled by the second user in the virtual space.

Character information may include information associated with a character controlled by a given user in the virtual space. Examples of character information may include an appearance of a user character, abilities of a user character within the virtual space, possessions in inventory of the user character, and/or other information associated with characters controlled by users in the virtual space.

Individual ones of the user accounts may include information stored by server(s) 102, one or more of the client computing platform(s) 104, and/or other storage locations. Such information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), virtual space usage information, demographic information associated with users, interaction history among users in the virtual space, information stated by users, purchase information of users, browsing history of users, a client computing platform identification associated with a user, a phone number associated with a user, and/or other information related to users.

The virtual item purchase module 110 may be configured to generate information that causes a purchase interface to be presented to a given user by a client computing platform 104 associated with the given user. The purchase interface may be configured to receive one or more user selections. The purchase interface may be configured to present one or more virtual items for purchase. The purchase interface may be configured to facilitate browsing and/or searching among the one or more presented virtual items. A selection from the given user may include a selection of a virtual item for purchase. The purchase interface may be configured to present one or more representations corresponding to other users with the given user has established a virtual space relationship. The purchase interface may be configured to facilitate browsing and/or searching among the other users with the given user has established a virtual space relationship. A selection from a user may include a selection of one or more other users with which the user has established a virtual space relationship.

Figure 2:
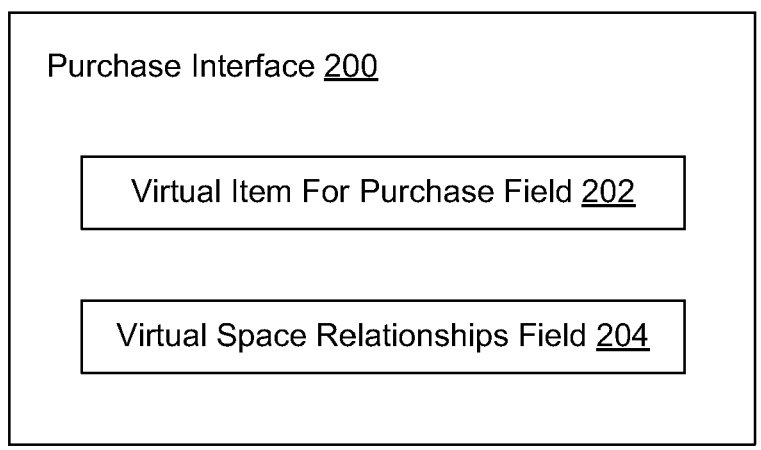
FIG. 2 illustrates a purchase interface provided in the system illustrated in FIG. 1, in accordance with one or more implementations.

FIG. 2 illustrates a purchase interface 200, which may be presented responsive to information generated by virtual item purchase module 110, in accordance with one or more implementations. As depicted in FIG. 2, purchase interface 200 includes one or more of a virtual item for purchase field 202, a virtual space relationships field 204, and/or other elements. The depiction of purchase interface 200 in FIG. 2 is not intended to be limiting as purchase interface 200 may include more or less elements than those shown. Furthermore, one or more elements of purchase interface 200 may be combined as a single element.

The virtual item for purchase field 202 may be configured to present one or more virtual items for purchase, of which a user may browse and/or search. According to various implementations, individual virtual items may be represented in virtual item for purchase field 202 by a graphic representation, a textual representation, and/or other representations indicative of a virtual item. The virtual item for purchase field 202 may be configured to receive a selection from the user of a virtual item for purchase. In some implementations, virtual item for purchase field 202 may present a cost of individual presented virtual items and/or a cost of the selected virtual item.

The virtual space relationships field 204 may be configured to present one or more representations corresponding to other users with which the given user has established a virtual space relationship. The virtual space relationships field 204 may be configured to facilitate browsing and/or searching among the representations. The virtual space relationships field 204 may be configured to receive a selection of one or more other users with which the user has established a virtual space relationship. According to some implementations, a given representation may include a graphic representation, a textual representation, and/or other representations indicative of other users with which the user has established a virtual space relationship. In some implementations, virtual space relationships field 204 may include a list of selectable icons associated with users with which the first user has established virtual space relationships without regard for whether the first user has established social network relationships with such users.

Referring again to FIG. 1, payment module 112 may be configured to obtain payment from a user for a virtual item. Such a virtual item may be one selected via virtual item purchase module 110. In some implementations, payment may be obtained from a third-party service via a credit card, a debit card, an electronic check, an internet payment service (e.g., PayPal), and/or other services for obtaining payment. Payment information may be obtained via a field included in the purchase interface.

The virtual item distribution module 114 may be configured to distribute the selected virtual item to the selected user in the virtual space. Such distribution may be responsive to selection by a first user through the purchase interface of a first virtual item and a second user with which the first user has established a virtual space relationship. In some implementations, distribution of the selected virtual item to the selected user may be responsive to obtaining the payment from the first user. Distribution of selected virtual item to the selected user may comprise providing control of the selected virtual item to the selected user in the virtual space. By way of non-limiting illustration, where the selected virtual item is a clothing article for a user character, the clothing article may be controlled by the selected user in the virtual space upon distribution of the clothing article. In some implementations, distribution of the selected virtual item to the selected user may comprise adding the selected virtual item to an inventory of a user character that is controlled by the selected user in the virtual space.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

The server(s) 102 may include electronic storage 118, one or more processors 120, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

The processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 110, 112, 114, and/or other modules. The processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
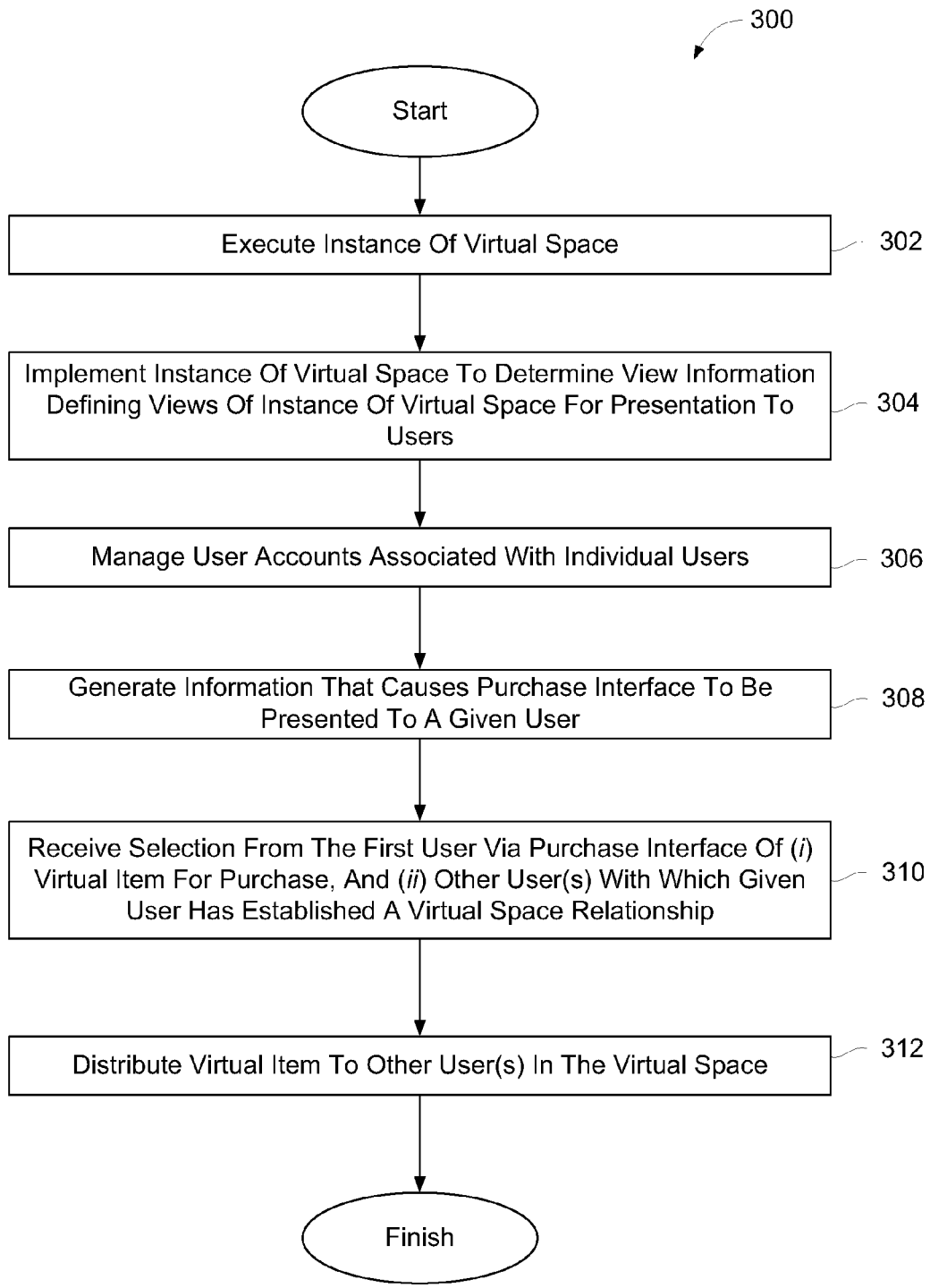
FIG. 3 illustrates a method of facilitating gifting of virtual items between users of a virtual space, in accordance with one or more implementations.

FIG. 3 illustrates a method 300 of facilitating gifting of virtual items between users of a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed. Operation 302 may be performed by a space module that is the same as or similar to space module 106, in accordance with one or more implementations.

At an operation 304, the instance of the virtual space may be implemented to determine view information defining views of the instance of the virtual space for presentation to users. Operation 304 may be performed by a space module that is the same as or similar to space module 106, in accordance with one or more implementations.

At an operation 306, user accounts associated with individual users may be managed. The user accounts may include a first user account associated with a first user. In some implementations, the first user account may comprise social network information, alliance information, and/or character information. The social network information may identify other users with which the first user has established social network relationships on a social networking platform that is separate from the virtual space. The alliance information may identify other users with which the first user has established virtual space relationships within the virtual space. The character information may include information for a first character controlled by the first user in the virtual space. Operation 306 may be performed by a user account module that is the same as or similar to user account module 108, in accordance with one or more implementations.

At an operation 308, information may be generated that causes a purchase interface to be presented to the first user. Operation 308 may be performed by a virtual item purchase module that is the same as or similar to virtual item purchase module 110, in accordance with one or more implementations.

At an operation 310, selection may be received from the first user via the purchase interface of (i) a virtual item for purchase, and (ii) one or more users with which the first user has established a virtual space relationship. Operation 310 may be performed by a virtual item purchase module that is the same as or similar to virtual item purchase module 110, in accordance with one or more implementations.

At an operation 312, the first virtual item may be distributed to the second user in the virtual space. Such distribution may be responsive to selection by the first user through the purchase interface of a first virtual item and a second user with which the first user has established a virtual space relationship. Operation 312 may be performed by a virtual item distribution module that is the same as or similar to virtual item distribution module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate gifting of virtual items between users of an online game, the system comprising:
    one or more processors configured by machine-readable instructions to:
        execute an instance of the online game on an online game server and to implement the instance of the online game on the online game server to determine view information defining views of the instance of the online game for presentation to users through a secondary platform;
        manage user accounts associated with individual users, the user accounts including a first user account associated with a first user, wherein the first user account comprises:
            secondary platform information that identifies a first set of users with which the first user has established secondary platform relationships on the secondary platform;
            alliance information that identifies a second set of users with which the first user has established online game relationships within the online game, wherein the established online game relationships are independent from the established secondary platform relationships; and
            character information for a first character controlled by the first user in the online game;
        generate information that causes a purchase interface to be presented to the first user, the purchase interface being configured to receive selection from the first user of (i) virtual currency for purchase, and (ii) one or more users from the second set of users; and
        distribute, responsive to selection by the first user through the purchase interface of a first amount of virtual currency and a second user with which the first user has established an online game relationship, the first amount of virtual currency to the second user in the online game, wherein the first amount of virtual currency is held in credit for the second user upon distribution.

2. The system of claim 1, wherein the one or more processors are configured by machine-readable instructions such that the purchase interface to be presented to the first user includes a list of selectable icons associated with users with which the first user has established online game relationships without regard for whether the first user has established secondary platform relationships with such users.

3. The system of claim 1, wherein the one or more processors are configured by machine-readable instructions such that the purchase interface presents a cost of the virtual currency.

4. The system of claim 3, wherein the one or more processors are further configured by machine-readable instructions to obtain payment from the first user for the virtual currency, such that distribution of the first virtual currency to the second user is responsive to obtaining the payment from the first user.

5. The system of claim 1, wherein the online game relationship between the first user and the second user comprises a relationship formed between the first character and a second character that is controlled by the second user in the online game.

6. The system of claim 1, wherein distribution of the virtual currency to the second user comprises providing control of the virtual currency to the second user in the online game.

7. The system of claim 1, wherein distribution of the virtual currency to the second user comprises adding the virtual currency to an inventory of a second character that is controlled by the second user in the online game.

8. The system of claim 1, wherein the one or more processors are configured by machine-readable instructions such that the online game is played by the first user and the second user in a virtual space.

9. A computer-implemented method of facilitating gifting of virtual items between users of an online game, the method being implemented in a computer system comprising one or more processors configured by machine-readable instructions, the method comprising:

executing an instance of the online game on an online game server;

implementing the instance of the online game on the online game server to determine view information defining views of the instance of the online game for presentation to users through a secondary platform;

managing user accounts associated with individual users, the user accounts including a first user account associated with a first user, wherein the first user account comprises:

secondary platform information that identifies a first set of users with which the first user has established secondary platform relationships on the secondary platform;

alliance information that identifies a second set of users with which the first user has established online game relationships within the online game, wherein the established online game relationships are independent from the established secondary platform relationships; and character information for a first character controlled by the first user in the online game;

generating information that causes a purchase interface to be presented to the first user, the purchase interface being configured to receive selection from the first user of (i) virtual currency for purchase, and (ii) one or more users from the second set of users; and distributing, responsive to selection by the first user through the purchase interface of a first amount of virtual currency and a second user with which the first user has established an online game relationship, the first amount of virtual currency to the second user in the online game, wherein the first amount of virtual currency is held in credit for the second user upon distribution.

10. The method of claim 9, wherein the purchase interface includes a list of selectable icons associated with users with which the first user has established online game relationships without regard for whether the first user has established secondary platform relationships with such users.

11. The method of claim 9, wherein the purchase interface presents a cost of the virtual currency.

12. The method of claim 11, further comprising obtaining payment from the first user for the virtual currency, and wherein distribution of the first virtual currency to the second user is responsive to obtaining the payment from the first user.

13. The method of claim 11, wherein the online game relationship between the first user and the second user comprises a relationship formed between the first character and a second character that is controlled by the second user in the online game.

14. The method of claim 9, wherein distribution of the virtual currency to the second user comprises providing control of the virtual currency to the second user in the online game.

15. The method of claim 9, wherein distribution of the virtual currency to the second user comprises adding the virtual currency to an inventory of a second character that is controlled by the second user in the online game.

16. The method of claim 9, wherein the online game is played by the first user and the second user in a virtual space.

* * * * *